United States Patent [19]

Okumura et al.

[11] Patent Number: 5,137,931
[45] Date of Patent: Aug. 11, 1992

[54] FOAMABLE PHENOLIC RESIN COMPOSITION AND PROCESS FOR PREPARATION THEREOF

[75] Inventors: Syuji Okumura; Shigetoshi Awano; Masahiro Kinoshita, all of Niwa; Kazuo Tamemoto, Tokyo; Akihiro Maruyama, Yokohama; Takumi Ishiwaka, Yokohama; Takashi Ohashi, Yokohama, all of Japan

[73] Assignees: Asahi Yukizai Kogyo Co., Ltd., Miyazaki; Bridgestone Corporation, Tokyo, both of Japan

[21] Appl. No.: 651,242

[22] PCT Filed: Jun. 1, 1990

[86] PCT No.: PCT/JP90/00716
§ 371 Date: Mar. 29, 1991
§ 102(e) Date: Mar. 29, 1991

[30] Foreign Application Priority Data

Jun. 1, 1989 [JP] Japan .................... 1-137506
Jun. 2, 1989 [JP] Japan .................... 1-139078

[51] Int. Cl.$^5$ .............................. C08J 9/00
[52] U.S. Cl. ................... 521/109.1; 521/84.1; 521/88; 521/114; 521/181
[58] Field of Search ............ 521/84.1, 88, 109.1, 521/114, 181

[56] References Cited

FOREIGN PATENT DOCUMENTS 36-10998 7/1961 Japan .
49-35470 4/1974 Japan .
54-34431 10/1979 Japan .
59-11339 1/1984 Japan .
59-219343 12/1984 Japan .
61-185535 8/1986 Japan .
61-238833 10/1986 Japan .

*Primary Examiner*—Morton Foelak
*Attorney, Agent, or Firm*—Burns, Doane, Swecker & Mathis

[57] ABSTRACT

Disclosed is a foamable phenolic resin composition comprising, as indispensable components, 100 parts by weight as solids of a resol type phenolic resin, 3 to 100 parts by weight of an acidic curing agent, 1 to 50 parts by weight of a blowing agent, 0.1 to 50 parts by weight of a saccharide and 0.1 to 10 parts by weight of a foam stabilizer, in which a partial or complete acetylation product of a castor oil/ethylene oxide adduct having a hydroxyl value smaller than 15 mg-KOH/g, which is obtained by acetylating a castor oil/ethylene oxide adduct formed by adding 20 to 70 moles of ethylene oxide to 1 mole of castor oil is used as the foam stabilizer and/or a resol type liquid penolic resin obtained by subjecting a phenol and an aldehyde to addition condensation reaction in the presence of a catalyst having a metal ion-forming capacity, in which the residual amount of the catalyst is smaller than 0.1 part by weight as the metal element per 100 parts by weight of the resol type phenolic resin, is used as the resol type liquid phenolic resin. This foamable phenolic resin composition provides a foam which has an excellent brittle resistance, heat-insulation, and stability with time, and in which the excellent heat-insulation is not affected by a reduction of the density and change of the ambient temperature. Also a process for the preparation of this foamable phenolic resin composition is disclosed.

12 Claims, No Drawings

FOAMABLE PHENOLIC RESIN COMPOSITION AND PROCESS FOR PREPARATION THEREOF

TECHNICAL FIELD

The present invention relates to a foaming phenolic resin composition used for the production of an acid-curing phenolic resin foam utilized mainly for a refractory heat-insulating material for construction, and a process for the preparation of this foaming phenolic resin composition.

BACKGROUND ART

A phenolic resin foam is low fuming and generates very little poisonous gas, and further, this foam has an excellent flame resistance and heat resistance. Accordingly, the phenolic resin foam has recently attracted attention as a refractory heat-insulating material in the fields of construction materials and ordinary industrial materials.

Nevertheless, as is well known, since the cell membrane defining cells in the phenolic resin foam is brittle and easily broken, during or after the production of the foam, the blowing agent is dissipated from the cells, resulting in a lowering of the heat-insulation thereof.

To overcome this defect, the inventors previously proposed a phenolic resin foam formed by foaming and curing a composition comprising a liquid phenolic resin, an acidic curing agent, a blowing agent, foam stabilizer and a saccharide (see Japanese Patent Publication No. 61-238833).

The phenolic resin foam disclosed in the above patent publication is superior to the conventional phenolic resin foam from the viewpoint of the resistance to brittleness (friability), heat-insulation and stability (at normal temperature), but if the density is reduced to reduce the weight and cost of the foam or the foam is placed in an environment wherein violent changes in the temperature occur, the heat-insulation is adversely affected, and because of this defect, the use of the foam is considerably restricted.

Therefore, a primary object of the present invention is to provide a foamable phenolic resin composition suitable for the production of a phenolic resin foam wherein the heat-insulation is not substantially influenced by the reduction of the density or changes of the ambient temperature, while the characteristics of the invention of Japanese Patent Publication No. 61-238833 are retained, and a process for the preparation of this foamable phenolic resin composition.

DISCLOSURE OF THE INVENTION

The inventors made an investigation with a view to overcoming the above-mentioned defect, and as a result, found that if a partial or complete acetylation product of a specific castor oil/ethylene oxide adduct is used as a foam stabilizer and/or a resol type liquid phenolic resin in which the residual amount of a catalyst having a metal ion-forming capacity adjusted below a specific level, the above-mentioned object can be attained. It also was found that a treatment with a weakly acidic cation exchange resin is especially effective as an industrial means of removing the catalyst contained in the resol type liquid phenolic resin. The present invention has now been completed based on these findings.

More specifically, in accordance with the present invention, there is provided a foamable phenolic resin composition comprising as indispensable components a resol type liquid phenolic resin, an acidic curing agent, (a blowing agent) a saccharide and a foam stabilizer, wherein a partial or complete acetylation product of a castor oil/ethylene oxide adduct having a hydroxyl value smaller than 15 mg-KOH/g, which is obtained by acetylating a castor oil/ethylne oxide adduct formed by adding 20 to 70 moles of ethylene oxide to 1 mole of castor oil, is used as the foam stabilizer, and/or a resol type liquid phenolic resin obtained by subjecting a phenol and an aldehyde to addition condensation reaction in the presence of a catalyst having a metal ion-forming capacity, in which the residual amount of the catalyst is smaller than 0.1 part by weight as calculated as the metal element per 100 parts by weight of solids of the resol type liquid phenolic resin, is used as the resol type liquid phenolic resin.

Furthermore, in accordance with the present invention, there is provided a process for the preparation of a foamable phenolic resin composition as set forth above, comprising as indispensable components a resol type liquid phenolic resin, an acidic curing agent, a blowing agent, a saccharide and a foam stabilizer, said process being characterized in that the resol type liquid phenolic resin is a resol type liquid phenolic resin prepared by subjecting a phenol and an aldehyde to addition condensation reaction in the presence of a catalyst having a metal ion-forming capacity, placing the reaction product in contact with a weakly acidic cation exchange resin to effect a removal of the catalyst, and concentrating the reaction product according to need, wherein the residual amount of the catalyst is smaller than 0.1 part by weight as the metal element per 100 parts by weight of solids of the resol type liquid phenolic resin, and/or a partial or complete acetylation product of a castor oil/ethylene oxide adduct having a hydroxyl number smaller than 15 mg-KOH/g, which is obtained by acetylating a castor oil/ethylene oxide adduct formed by adding 20 to 70 moles of ethylene oxide to 1 mole of castor oil, is used as the foam stabilizer.

BEST MODE OF CARRYING OUT THE INVENTION

The resol type liquid phenolic resin used in the present invention can be prepared by subjecting a phenol and an aldehyde at an aldehyde/phenol molar ratio of at least 0.8, preferably 1 to 4, to an addition condensation reaction, and preferably, neutralizing and concentrating the condensation product A resol type liquid phenolic resin prepared by forming a condensation product by carrying out the addition condensation reaction in the presence of a catalyst having a metal ion-forming capacity, performing the catalyst-removing treatment and desirably, concentrating the product is preferably used. In this resol type liquid phenolic resin, preferably the residual amount of the catalyst is smaller than 0.1 part by weight, most preferably 0.07 part by weight, as calculated as the metal element per 100 parts by weight of solids of the resol type liquid phenolic resin. The content of solids referred to herein means the content (expressed in terms of parts by weight or % by weight) of a non-volatile component obtained by charging 10±0.1 g of the resol type liquid phenolic resin in an aluminum foil vessel (100 mm×100 mm) and allowing the vessel to stand on a hot plate maintained at 180° C. for 40 minutes. The residual amount of the catalyst means the content of the metal in the resol type liquid phenolic resin, determined by the atomic absorption spectroscopy, which is expressed by parts by weight or % by weight based on 100 parts of the solid content of the resol type liquid phenolic resin.

As the phenol, there can be generally used phenol, alkylphenols such as cresol, xylenol, nonylphenol and p-t-butylphenol, polyhydric phenols such as resorcinol, catechol and pyrogallol, bisphenols such as bisphenol A and bisphenol F, and phenolic purification residues such as cresol residues, resorcinol residues, catechol residue and bisphenol A residue. As the aldehyde, there are generally used formaldehyde-supplying substances such as formalin, paraformaldehyde and acetal, and formaldehyde equivalent substances such as glyoxal and furfural. Note, the phenol and aldehyde referred to herein are not limited to those exemplified above. Furthermore, at least two phenols or aldehydes can be used in combination.

As the catalyst, there can be used alkaline metal compounds such as sodium hydroxide, potassium hydroxide, lithium hydroxide, sodium phosphate, potassium carbonate, sodium hydrogencarbonate, barium hydroxide, calcium hydroxide and calcium oxide, basic amine compounds such as ammonia, hexamethylenetetramine, triethylamine and triethanolamine, acidic divalent metal salts such as zinc borate, zinc acetate, lead acetate, lead naphthenate and zinc chloride, and mixtures of two or more of the foregoing compounds. Among these catalysts, those having a high catalytic activity and a metal ion-forming capacity, which can be easily removed by a weakly acidic cation exchange resin described hereinafter, are preferably used, and alkaline metal compounds having a high water solubility, such as hydroxides and oxides of potassium, sodium, lithium and barium, are especially preferably used.

For removal of the catalyst, i.e., a catalyst-removing treatment, there can be adopted a method in which the neutralization is effected with an acidic compound such as hydrochloric acid, sulfuric acid, phosphoric acid, boric acid, oxalic acid, acetic acid, lactic acid, phenol-sulfonic acid, p-toluene-sulfonic acid or a mixture thereof, and then the filtration treatment and/or the water washing treatment is carried out, or a method in which the treatment is carried out with a chelate resin or a cation exchange resin. In view of the operation efficiency and the catalyst removal efficiency, however, the treatment with an acidic cation exchange resin, especially a weakly acidic cation exchange resin, is preferably adopted. When a strongly acidic cation exchange resin is used, various disadvantages arise. For example, a gelation of the condensation product in the surface and inner layers of the ion exchange resin makes a regeneration of the ion exchange resin impossible, and the manufacturing cost of the resol type liquid phenolic resin is thus increased. Moreover, since the condensation product after the treatment is strongly acidic and the pH value is smaller than 2.0, there is a danger that an abnormal increase of the molecular weight or gelation will occur at the concentrating step. Still further, the obtained resol type liquid phenolic resin has a poor storage stability. These disadvantages can be overcome if a weakly acidic cation exchange resin is used.

An acrylic or methacrylic H-type cation exchange resin composed of a copolymer of acrylic acid or methacrylic acid with divinylbenzene and having a carboxylic acid exchange group is preferably used as the weakly acidic cation exchange resin. As specific examples, there can be mentioned commercially available products such as Diaion WK10, Diaion WK11 and Diaion WK20 (supplied by Mitsubishi Kasei Kogyo), and Lewatit CNP-80 (supplied by Mitsui-Toatsu Fine Chemicals). Furthermore, there can be used products obtained by introducing a weakly acidic exchange group such as a carboxylic acid, orthophosphoric acid, phosphorous acid, hypophosphorous acid or phosphonic acid into a base resin such as a phenolic resin, a styrene resin or a styrene/divinylbenzene copolymer, and products obtained by converting a weakly acidic cation exchange resin having a salt type exchange group such as —COONa to an H type by hydrochloric acid or sulfuric acid.

The shape and water content of the weak cation exchange resin are not particularly critical. The weakly acidic cation exchange resin can be optionally used in the form of a powder, a granule a bead, a fiber, a film or the like, and the water content can be adjusted to an optional level.

The catalyst-removing method using the weak acid cation exchange resin is not particularly critical. For example, there can be appropriately selected a continuous treatment method in which the condensation product is continuously injected into a fixed bed of the ion exchange resin to effect a contact treatment, and a batchwise treatment method in which the system comprising the ion exchange resin and the reaction product is subjected to mechanical agitation or ultrasonic vibration to effect a contact treatment.

The kind of the foam stabilizer used in the present invention is not particularly critical, and any of various surfactants (foam stabilizers) heretofore used in the art can be used. Among them, nonionic surface active agents such as polysiloxanes, polyoxyethylene sorbitan fatty acid esters, castor oil/ethylene oxide adducts and alkylphenol/ethylene oxide adducts are preferably used. A partial or complete acetylation product of a castor oil/ethylene oxide adduct, newly found by the present inventors, is especially preferably used. If this partial or complete acetylation product is combined with the resol type liquid phenolic resin in which the residual amount of the catalyst is controlled below a certain level as mentioned above, the object of the present invention (especially, the improvement of the heat-insulating property) is more effectively attained. The partial or complete acetylation product of a castor oil-/ethylene oxide adduct can be prepared by subjecting 1 mole of castor oil and 20 to 70 moles, Preferably 30 to 60 moles of ethylene oxide to the addition reaction and reacting the obtained castor oil/ethylene oxide with an acetylating agent such as acetic anhydride, acetyl chloride or glacial acetic acid to adjust the hydroxyl value below 15 mg-KOH/g, preferably 10 mg-KOH/g. If one or both of the amounts added (mole number) of ethylene oxide and the hydroxyl value are outside the above-mentioned ranges, the attained foam-stabilizing effect is as low as the effect attained by the conventional castor oil/ethylene oxide adduct. The surfactant is used in an amount of 0.1 to 10 parts by weight, preferably 2 to 5 parts by weight, per 100 parts weight of solids of the resol type liquid phenolic resin.

The kind of the acidic curing agent used in the present invention is not particularly critical, and any various acidic curing agents customarily used in the art can be used. For example, there can be mentioned organic sulfonic acids such as p-toluene-sulfonic acid, xylene-sulfonic acid, m-xylene-sulfonic acid, benzene-sulfonic acid, phenol-sulfonic acid, polymeric sulfonic acid and styrene-sulfinic acid, inorganic acids such as phosphoric acid and sulfuric acid, and mixtures thereof. The acidic curing agent is used in an amount of 3 to 100 parts by weight, preferably 3 to 60 parts by weight, per 100 parts by weight of solids of the resol type liquid phenolic resin.

An appropriate blowing agent is selected according to the required heat-insulating performances in the present invention, but generally, halogenated hydrocarbons are used as the blowing agent. For example, there can be mentioned chlorohydrocarbons such as methylene chloride, 1,2-dichloroethane, trichloroethane and tetrachloromethane, halogenated fluorocarbons such as trichloromonofluoromethane, dichloromonofluoromethane, 1,1,2-trichlorotrifluoroethane, 1,2-dichlorotetrafluoroethane 1,1-dichloro-1-fluoroethane, 1,1-dichloro-2,2,2-trifluoroethane, 1,1-dichloro-2,2,3,3,3-pentafluoropropane and 1,3-dichloro-1,1,2,2,3-pentafluoropropane, and mixtures thereof. From the viewpoint of heat-insulating performances, halogenated fluorocarbons especially preferably used. Furthermore, according to the intended use, aliphatic hydrocarbons such as butane, pentane and hexane, aliphatic ethers such as diethyl ether, diisopropyl ether and chemical blowing agents such as sodium hydrogencarbonate can be used alone or in combination with the above-mentioned halogenated hydrocarbons. The blowing agent is generally used in an amount of 1 to 50 parts by weight per 100 parts by weight of solids of the resol type liquid phenolic resin.

As the saccharide used in the present invention, there can be mentioned monosaccharides, disaccharides, trisaccharides and polysaccharides. More specifically, there can be mentioned ribose, xylose, arabinose glucose, mannose, galactose, fructose, maltose, lactose, sucrose, molasses, raffinose, gentianose, stachyose, celluloses such as carboxymethyl cellulose and hydroxyethyl cellulose, starches such as corn starch and potato starch, gum arabic and fructan. Among them, sucrose, molasses, fructose, glucose lactose, maltose and gum arabic are preferably used. The saccharide is generally used in an amount of 0.1 to 50 parts by weight per 100 parts by weight of solids of the resol type liquid phenolic resin.

In addition to the above-mentioned components, various additives, for example, curing promoters such as resorcinol and alkylresorcinols, formaldehyde-sequestering agents such as urea and melamine, flame retardants such as melamine resins, phosphorus-containing compounds and halogen-containing compounds, inorganic and organic fillers such as silas balloon, glass balloon, porous aggregates and wood flour, fibrous reinforcers such as ceramic fibers, glass fibers, carbon fibers, phenolic fibers, aramid fibers and vinylon fibers, anti-corrosive agents such as polyisocyanate, plasticizers, silane coupling agents, titanium coupling agents, and coloring agents can be added to the foamable phenolic resin composition of the present invention according to need.

The foamable phenolic resin composition of the present invention can be prepared by using the above-mentioned resol type liquid phenolic resin, acidic curing agent, blowing agent, foam stabilizer and saccharide, and various additives incorporated according to need, by any known method of preparing foamable compositions, for example, a batchwise or continuous high-speed stirring process, a spraying process, a froth process, and a combination of two or more of these processes.

The thus-obtained foamable phenolic resin composition of the present invention is formed into a phenolic resin foam according to any known foaming process, for example, a continuous foaming process, a mold foaming process, an in-situ foaming process and an impregnation foaming process, and is used as a refractory heat-insulating material for a ceiling material, an inner wall material, an outer wall material, a floor base, a sliding door, an automobile ceiling, a refrigerator, a show case, a tank, a delivery vessel, a piping and the like.

In the foamable phenolic resin composition of the present invention, since a resol type liquid phenolic resin in which the amount of the residual metal ion-forming catalyst is very small is used, the amount of a neutral salt formed by the reaction of the catalyst with the acid curing agent at the foaming step, which is considered to be one cause of a breaking of the cell membranes, is very small, and/or a strong foam stabilizing effect is imparted by using a specific foam stabilizer as mentioned above and foams can be stabilized. Furthermore, the action of the saccharide improves the film-forming property, and a plasticity (toughness) can be imparted to the formed film. Therefore, a breaking of the cell membranes is severely controlled, and it is considered that a reduction of the heat-insulation due to a reduction of the density of the foam or the change of the ambient temperature can be prevented.

The following effects can be attained by the present invention.

The foamable phenolic resin composition of the present invention retains an excellent flame resistance, brittle resistance and heat-insulation as disclosed in Japanese Patent Publication No. 61-238833, and furthermore, provides a phenolic resin foam having a heat-insulation which is little influenced by the reduction of the density and the change of the ambient temperature. Furthermore, the reduction of the density reduces the weight and cost, with the result that the workability is improved and large economical advantages can be attained. Moreover, according to the process of the present invention, a resol type liquid phenolic resin having a reduced content of a metal ion-forming catalyst, which is valuable for the production of a foamable phenolic resin composition having the above-mentioned excellent performances and advantages, can be simply prepared at a high efficiency and a low cost.

The present invention will now be described in detail with reference to the following examples, that by no means limit the scope of the invention. Note, in the examples and comparative examples, all of "%" are by weight unless otherwise indicated. Characteristic values, other than those mentioned above, of the resol type liquid phenolic resin and the physical properties of the foam were determined according to the following methods.

1. The viscosity was measured by a B-type viscometer, the pH value was measured by a pH meter and the water content was measured according to the Karl Fisher method.

2. The number average molecular weight was measured by using a calibration curve of standard polystyrene in the gel permeation chromatography.

3. The density was measured according to the method of JIS A-9514, the thermal conductivity was measured by the hot wire method, and the oxygen index was measured according to the method of JIS K-7201.

4. At the heat cycle test, the sample was subjected to the heat history of one cycle where the sample was maintained at 10° C. for 12 hours and at 80° C. for 12 hours, and this heat history was repeated 10 times. Then, the thermal conductivity was measured by the hot wire method and reduction of heat-insulating performances by the change of the temperature was examined.

EXAMPLE 1

Preparation of Resol Type Liquid Phenolic Resin A

A reaction vessel equipped with a reflux cooler, at thermometer and a stirrer was charged with 30 kg of phenol, 30.6 kg of 47% formalin and 1.35 kg of a 20% aqueous solution of potassium hydroxide, and the temperature was elevated with stirring and addition condensation reaction was carried out at about 100° C. for 120 minutes, and the reaction mixture then cooled to about 50° C. The viscosity of the obtained condensation product was 34 CP/50° C. The pH value was then adjusted to 5.8 by using a 40% aqueous solution of phenolsulfonic acid, and the condensation product was heated and concentrated under a vacuum of 60 mmHg to obtain a resol type phenolic resin A (hereinafter referred to as "resin A"). The obtained resin A had a viscosity of 100 CP/25° C., a number average molecular weight of 275 a water content of 11.8% and a solid content of 78%.

Preparation of Foamable Phenolic Resin Composition and Foam

To 10 kg of the above-mentioned resin A were added liquid I comprising 0.6 kg of sucrose as the saccharide and 0.3 kg of a foam stabilizer (Pionin D-245A supplied by Takemoto Yushi; partial acetylation product of adduct of 45 moles of ethylene oxide to caster oil having a hydroxyl value of 3 mg-KOH/g), liquid II comprising Flon 113 (1,1,2-trichlorotrifluoroethane supplied by Asahi Glass) and liquid III comprising a 65% aqueous solution of phenolsulfonic acid as the acidic curing agent at a liquid I/liquid II/liquid III weight ratio of 100/16/16, and were mixed by a foaming machine for phenol foams (Model PA-210 supplied by Toho Kikai) to prepare a foamable phenolic resin composition. The composition was promptly cast in a mold in which kraft paper having a basis weight of 75 g/m$^2$ was spread and which was maintained at 70° C. The composition was foamed and set under a light compression to obtain a molded foam (1800 mm×900 mm×25 mm).

The physical properties of the obtained foam after 7 days' standing at 20° C. and the thermal conductivity of the foam after 30 days' standing at 20° C. were determined according to the above-mentioned test methods. The results are shown in Table 1.

EXAMPLES 2 THROUGH 4 AND COMPARATIVE EXAMPLES 1 THROUGH 4

Foamable phenolic resin compositions and foams thereof were prepared in the same manner as described in Example 1 except that foam stabilizers differing in the amount added (mole number) of ethylene oxide or the hydroxyl value were used instead of Pionin D-245A.

The obtained foams were treated in the same manner as described in Example 1 and the physical properties were determined according to the above-mentioned test methods. The results are shown in Table 1.

EXAMPLE 5

A foamable phenolic resin composition and a foam thereof were prepared in the same manner as described in Example 1 except that AK-225 (blowing agent supplied by Asahi Glass; mixture of 1,1-dichloro-2,2,3,3,3-pentafluoropropane and 1,3-dichloro-1,1,2,2,3-pentafluoropropane) was used instead of Flon 113 as the blowing agent. The obtained foam was treated in the same manner as described in Example 1, and the physical properties of the foam were determined according to the above-mentioned test methods. The results are shown in Table 1.

TABLE 1

|  |  | Example 1 | Example 2 | Example 3 | Example 4 | Example 5 | Comparative Example 1 |
|---|---|---|---|---|---|---|---|
| Foam Stabilizer | main chain | castor oil | castor oil | castor oil | castor oil | castor oil | castor oil |
|  | amount added (mole number) of ethylene oxide | 45 | 45 | 30 | 60 | 45 | 45 |
|  | hydroxyl value (mg-KOH/g) | 3 | 10 | 5 | 5 | 3 | 30 |
| Foam Characteristics | density (g/cm$^3$) | 0.0423 | 0.0418 | 0.0430 | 0.0420 | 0.0427 | 0.0421 |
|  | thermal conductivity (Kcal/ m · H °C.) after 7 days | 0.018 | 0.018 | 0.018 | 0.018 | 0.018 | 0.018 |
|  | after 30 days | 0.018 | 0.018 | 0.018 | 0.018 | 0.018 | 0.019 |
|  | after heat cycle test | 0.024 | 0.024 | 0.024 | 0.023 | 0.024 | 0.030 |
|  | oxygen index | 39 | 39 | 39 | 39 | 39 | 39 |
|  | friability (%) | 15 | 16 | 15 | 15 | 10 | 15 |

|  |  |  | Comparative Example 2 | Comparative Example 3 | Comparative Example 4 |
|---|---|---|---|---|---|
| Foam Stabilizer | main chain |  | castor oil | castor oil | castor oil |
|  | amount added (mole number) of ethylene oxide |  | 45 | 15 | 100 |
|  | hydroxyl value (mg-KOH/g) |  | 70 | 5 | 5 |
| Foam Characteristics | density (g/cm$^3$) |  | 0.0428 | no uniform foam was formed | 0.0420 |
|  | thermal conductivity (Kcal/ m · H °C.) | after 7 days | 0.018 |  | 0.020 |
|  |  | after 30 days | 0.019 |  | 0.030 |
|  |  | after heat cycle test | 0.031 |  | 0.031 |
|  | oxygen index |  | 39 | — | 37 |
|  | friability (%) |  | 16 | — | 16 |

EXAMPLE 6

The same reaction vessel as described in Example 1 was charged with 30 kg of phenol, 34.6 kg of 47% formalin and 1.5 kg of a 20% aqueous solution of potassium hydroxide, the temperature was elevated with stirring, and an addition condensation reaction was carried out at about 100° C. for 90 minutes. The reaction mixture was then cooled to about 50° C. The viscosity of the obtained condensation product was 30 CP/50° C.

Then, 3 kg of a weakly acidic cation exchange resin (Lewatit CNP-80 supplied by Mitsui-Toatsu Fine Chemicals; acrylic COOH type; total exchange capacity of 4.8 meq/ml) was added to the reaction product to effect the catalyst-removing treatment. The pH value of the condensation product obtained by removal of the weakly acidic cation exchange resin by filtration was 4.8. The obtained condensation product was then heated and concentrated under a vacuum of 60 mmHg to obtain a resol type liquid phenolic resin B (hereinafter referred to as "resin B"). The obtained resin B had a viscosity of 4000 CP/25° C., a number average molecular weight of 270, a water content of 11.0%, a solid content of 79% and a potassium content of 0.025%. The total ion exchange capacity of the recovered weakly acidic cation exchange resin was reduced to 1.8 meq/ml, and an abnormal phenomenon such as adhesion of a gelation product of the condensation product was not found. When this weakly acidic cation exchange resin was washed with methanol, regenerated with an aqueous solution of hydrochloric acid and washed with pure water, the total exchange capacity was restored to 4.7 meq/ml and it was confirmed that the cation exchange resin could be utilized again.

A foamable phenolic resin composition and a foam thereof were prepared in the same manner as described in Example 1 except that the resin B was used instead of the resin A and the liquid I/liquid II/liquid III weight ratio was changed to 100/20/16 from 100/16/16. The obtained foam was treated in the same manner as described in Example 1 and the physical properties were determined according to the above-mentioned test methods. The results are shown in Table 2.

EXAMPLES 7 THROUGH 9

Foamable phenolic resin compositions and foam thereof were prepared in the same manner as described in Example 6 except that foam stabilizers differing in the amount added (mole number) of ethylene oxide or the hydroxyl value were used instead of Pionin D-245A.

The foams were treated in the same manner as described in Example 6 and the physical properties were determined according to the above-mentioned test methods. The results are shown in Table 2.

EXAMPLE 10

A foamable phenolic resin composition and a foam thereof were prepared in the same manner as described in Example 6 except that the liquid I/liquid II/liquid III weight ratio was changed to 100/15/15 from 100/20/16. The obtained foam was treated in the same manner as described in Example 6 and the physical properties of the foam were determined according to the above-mentioned test methods. The results are shown in Table 2.

EXAMPLE 11

A resol type liquid phenolic resin C (hereinafter referred to as "resin C") was prepared in the same manner as described in Example 6 except that the amount of Lewatit CNP-80 as the weakly cation exchange resin was changed to 2.5 kg from 3 kg. The obtained resin C had a viscosity of 4500 CP/25° C., a number average molecular weight of 272, a water content of 11.2%, a solid content of 79% and a potassium content of 0.089%. The pH value of the condensation product after the catalyst-removing treatment but before the concentration was 5.9.

A foamable phenolic resin composition and a foam thereof were prepared in the same manner as described in Example 6 except that the resin C was used instead of the resin B. The obtained foam was treated in the same manner as described in Example 6 and the physical properties of the foam were determined according to the above-mentioned test methods. The results are shown in Table 2.

EXAMPLE 12

A resol type liquid phenolic resin D (hereinafter referred to as "resin D") was prepared in the same manner as described in Example 6 except that 4.5 kg of Diaion WK11 (methacrylic COOH type weakly acidic cation exchange resin supplied by Mitsubishi Yuka; total exchange capacity of 2.9 meq/ml) was used instead of Lewatit CNP-80. The obtained resin D had a viscosity of 4600 CP/25° C., a number average molecular weight of 273, a water content of 11.3%, a solid content of 79% and a potassium content of 0.063%. The pH value of the condensation product after the catalyst-removing treatment and before the concentration was 5.4.

A foamable phenolic resin composition and a foam thereof were prepared in the same manner as described in Example 6 except that the resin D was used instead of the resin B. The foam was treated in the same manner as described in Example 6, and the physical properties of the obtained foam were determined according to the above-mentioned methods. The results are shown in Table 2.

EXAMPLE 13

A resol type liquid phenolic resin E (hereinafter referred to as "resin E") was prepared in the same manner as described in Example 6 except that Lewatit CNP-80 which had been subjected to the regeneration treatment 20 times was used as the weakly acidic cation exchange resin. The obtained resin E had a viscosity of 4200 CP/25° C., a number average molecular weight of 273, a water content of 10.9%, a solid content of 79% and a potassium content of 0.038%. The pH value of the condensation product after the catalyst-removing treatment and before the concentration was 5.0.

A foamable phenolic resin composition and a foam thereof were prepared in the same manner as described in Example 6 except that the resin E was used instead of the resin B. The obtained foam was treated in the same manner as described in Example 6 and the physical properties of the foam were determined according to the above-mentioned test methods. The results are shown in Table 2.

EXAMPLE 14

A resol type liquid type phenolic resin F (hereinafter referred to as "resin F") was prepared in the same manner as described in Example 6 except that the viscosity at the termination of dehydration was increased. The obtained resin F had a viscosity of 15000 CP/25° C., a number average molecular weight of 274, a water content of 6.5%, a solid content of 83% and a potassium content of 0.026%.

A foamable phenolic resin composition and a foam thereof were prepared in the same manner as described in Example 6 except that AF-123 (1,1-dichloro-2,2,2-trifluoroethane supplied by Asahi Glass) was used as the blowing agent instead of Flon 113, a 1/1 weight ratio mixture of 65% phenolsulfonic acid/phosphoric acid was used as the curing agent instead of 65% phenolsulfonic acid and the resin F was used instead of the resin B. The obtained foam was treated in the same manner as described in Example 6 and the physical properties of the foam were determined according to the above-mentioned test methods. The results are shown in Table 2.

EXAMPLE 15

A foamable phenolic resin composition and a foam thereof were prepared in the same manner as described in Example 6 except that the resin F was used instead of the resin B, AF-141b (1,1-dichloro-1-fluoroethane supplied by Asahi Glass) was used as the blowing agent instead of Flon 113 and a 1/1 weight ratio mixture of 65% phenolsulfonic acid/phosphoric acid was used as the curing agent instead of 65% phenolsulfonic acid. The obtained foam was treated in the same manner as described in Example 6 and the physical properties of the foam were determined according to the above-mentioned test methods. The results are shown in Table 2.

EXAMPLE 16

The same reaction vessel as described in Example 1 was charged with 30 kg of phenol, 34.6 kg of 47% formalin and 1.5 kg of a 20% aqueous solution of potassium hydroxide, and the temperature was elevated with stirring and addition condensation reaction was carried out at about 100° C. for 90 minutes. The reaction mixture was then cooled to about 50° C., and the viscosity of the obtained condensation product was 31 CP/50° C. Then, a 40% aqueous solution of phenolsulfonic acid was added, to adjust the pH value to 5.8, and the condensation product was heated and concentrated under a vacuum of 60 mmHg to obtain a resol type liquid phenolic resin G (herein after referred to as "resin G") having a viscosity of 4500 CP/25° C., a number average molecular weight of 268, a water content of 11.2%, a solid content of 78%, and a potassium content of 0.564%.

Then, a foamable phenolic resin composition and a foam thereof were prepared in the same manner as described in Example 6 except that the resin G was used instead of the resin B. The obtained foam was treated in the same manner as described in Example 6 and the physical properties of the foam were determined according to the above-mentioned test methods. The results are shown in Table 2.

EXAMPLE 17

A foamable phenolic resin composition and a foam thereof were prepared in the same manner as described in Example 6 except that the resin G was used instead of the resin B and the liquid I/liquid II/liquid III weight ratio was changed to 100/15/15 from 100:20:16. The obtained foam was treated in the same manner as described in Example 6, and the physical properties of the foam were determined according to the above-mentioned test methods. The results are shown in Table 2.

EXAMPLE 18

A resol type liquid phenolic resin H (hereinafter referred to as "resin H") was prepared in the same manner as described in Example 6 except that the amount of Lewatit CNP-80 used as the weakly acidic cation exchange resin was changed to 2 kg from 3 kg. The obtained resin H had a viscosity of 4700 CP/25° C., a number average molecular weight of 265, a water content of 11.3%, a solid content of 78% and a potassium content of 0.192%. The pH value of the condensation product after the catalyst-removing treatment but before the concentration was 7.5.

A foamable phenolic resin composition and a foam thereof were prepared in the same manner as described in Example 6 except that the resin H was used instead of the resin B and the liquid I/liquid II/liquid III weight ratio was changed to 100/20/19 from 100/20/16. The obtained foam was treated in the same manner as described in Example 6 and the physical properties of the foam were determined according to the above-mentioned test methods. The results are shown in Table 2.

EXAMPLE 19

A foamable phenolic resin composition and a foam thereof were prepared in the same manner as described in Example 6 except that the resin H was used instead of the resin B and the liquid I/liquid II/liquid III weight ratio was changed to 100/15/18 from 100/20/16. The obtained foam was treated in the same manner as described in Example 6, and the physical properties of the foam were determined according to the above-mentioned test methods. The results are shown in Table 2.

COMPARATIVE EXAMPLE 5

The same reaction vessel as described in Example 1 was charged with 30 kg of phenol, 34.6 kg of 47% formalin and 1.5 kg of a 20% aqueous solution of potassium hydroxide, and the temperature was elevated with stirring and addition condensation reaction was carried out at about 100° C. for 90 minutes. Then, the reaction mixture was cooled to obtain a condensation product having a viscosity of 30 CP/50° C.

Then, 8 kg of SP-112TS (strongly acidic cation exchange resin supplied by Mitsui-Toatsu Fine Chemicals; styrene $SO_3H$ type; total exchange capacity of 1.7 meq/ml) was added to the reaction product, and the mixture was stirred at about 50° C. for 80 minutes to effect the catalyst-removing treatment. The pH value of the condensation product after removal of the catalyst by filtration was 2.8. The condensation product was heated and concentrated under a vacuum of 60 mmHg. Gelation was caused midway and an intended resol type liquid phenolic resin could not be obtained. The gelled phenolic resin adhered to the surface of the recovered strongly acidic cation exchange resin, and the color of the cation exchange resin per se was changed to red from light brown. When the cation exchange resin was washed with methanol, treated with an aqueous solution of hydrochloric acid and washed with pure water and the total exchange capacity was measured, it was found that the total exchange capacity was 0.1 meq/ml, and it was confirmed that the exchange resin could not be regenerated.

TABLE 2

| | Example 6 | Example 7 | Example 8 | Example 9 | Example 10 | Example 11 | Example 12 | Example 13 |
| --- | --- | --- | --- | --- | --- | --- | --- | --- |

TABLE 2-continued

| Phenolic Resin | | | resin B | resin B | resin B | resin B | resin B | resin C | resin D | resin E |
|---|---|---|---|---|---|---|---|---|---|---|
| Residual Content (%) of Metal of Synthetic Catalyst in Phenolic Resin | | | 0.025 | 0.025 | 0.025 | 0.025 | 0.025 | 0.089 | 0.063 | 0.038 |
| Kind of Ion Exchange Resin | | | acrylic —COOH type | acrylic —COOH type | acrylic —COOH type | acrylic —COOH type | acrylic —COOH type | acrylic —COOH type | methacrylic —COOH type | acrylic —COOH type after 20 regeneration treatments |
| pH Value of Condensate after Ion Exchange | | | 4.8 | 4.8 | 4.8 | 4.8 | 4.8 | 5.9 | 5.4 | 5.0 |
| Structure of surfactant | main chain | | castor oil | castor oil | castor oil | castor oil | castor oil | castor oil | castor oil | castor oil |
| | amount added (mole number) of ethylene oxide | | 45 | 45 | 60 | 45 | 45 | 45 | 45 | 45 |
| | hydroxyl value (mg-KOH/g) | | 3 | 12 | 10 | 70 | 3 | 3 | 3 | 3 |
| Physical Properties of Foam | density (g/cm$^3$) | | 0.0312 | 0.0315 | 0.0320 | 0.0310 | 0.0410 | 0.0310 | 0.0310 | 0.0312 |
| | thermal conductivity (Kcal/m·H°C.) | after 7 days | 0.017 | 0.018 | 0.017 | 0.020 | 0.016 | 0.018 | 0.018 | 0.017 |
| | | after 30 days | 0.017 | 0.018 | 0.018 | 0.021 | 0.016 | 0.019 | 0.018 | 0.017 |
| | | after heat cycle test | 0.018 | 0.019 | 0.019 | 0.023 | 0.017 | 0.021 | 0.019 | 0.018 |
| | oxygen index | | 40 | 40 | 40 | 40 | 40 | 40 | 40 | 40 |
| | friability (%) | | 22 | 23 | 23 | 23 | 14 | 23 | 23 | 22 |

| | | | Example 14 | Example 15 | Example 16 | Example 17 | Example 18 | Example 19 | Comparative Example 5 |
|---|---|---|---|---|---|---|---|---|---|
| Phenolic Resin | | | resin F | resin F | resin G | resin G | resin H | resin H | — |
| Residual Content (%) of Metal of Synthetic Catalyst in Phenolic Resin | | | 0.026 | 0.026 | 0.564 | 0.564 | 0.192 | 0.192 | — |
| Kind of Ion Exchange Resin | | | acrylic —COOH type | acrylic —COOH type | not added | not added | acrylic —COOH type | acrylic —COOH type | styrene —SO$_3$H type |
| pH Value of Condensate after Ion Exchange | | | 4.8 | 4.8 | 5.8 | 5.8 | 7.5 | 7.5 | 2.8 |
| Structure of surfactant | main chain | | castor oil | castor oil | castor oil | castor oil | castor oil | castor oil | castor oil |
| | amount added (mole number) of ethylene oxide | | 45 | 45 | 45 | 45 | 45 | 45 | 45 |
| | hydroxyl value (mg-KOH/g) | | 3 | 3 | 3 | 3 | 3 | 3 | 3 |
| Physical Properties of Foam | density (g/cm$^3$) | | 0.0360 | 0.0340 | 0.0318 | 0.0414 | 0.0312 | 0.0412 | gelation caused during concentration, and no resin obtained |
| | thermal conductivity (Kcal/m·H°C.) | after 7 days | 0.019 | 0.019 | 0.020 | 0.018 | 0.019 | 0.017 | |
| | | after 30 days | 0.019 | 0.019 | 0.025 | 0.018 | 0.024 | 0.017 | |
| | | after heat cycle test | 0.022 | 0.022 | 0.027 | 0.025 | 0.026 | 0.024 | |
| | oxygen index | | 40 | 40 | 39 | 39 | 40 | 40 | |
| | friability (%) | | 19 | 20 | 23 | 15 | 23 | 15 | |

INDUSTRIAL APPLICABILITY

The foamable phenolic resin composition of the present invention is preferably applied to the production of a phenolic resin foam, the heat-insulation of which is little influenced by a reduction of the density or change of the ambient temperature, and is mainly used as a refractory heat-insulating material for a ceiling material, an inner wall material, an outer material, a floor base, a sliding door, an automobile ceiling, a show case, a tank, a delivery vessel, and piping and the like.

We claim:

1. A foamable phenolic resin composition comprising, as indispensable components, (a) 100 parts by weight (as solids) of a foamable resol liquid phenolic resin (b) 3 to 100 parts by weight of an acidic curing agent, (c) 1 to 50 parts by weight of a blowing agent, (d) 0.1 to 50 parts by weight of a saccharide and (e) 0.1 to 10 parts by weight of a surfactant, wherein the foam stabilizer is a partial or complete acetylation product of a castor oil/ethylene oxide adduct having a hydroxyl value smaller than 15 mg-KOH/g, which is obtained by acetylating a castor oil/ethylene oxide adduct formed by adding 20 to 70 moles of ethylene oxide to 1 mole of castor oil.

2. A composition as set forth in claim 1, wherein the foam stabilizer is a partial or complete acetylation product of a castor oil/ethylene oxide adduct having a hydroxyl value smaller than 15 mg-KOH/g, which is obtained by acetylating a castor oil/ethylene oxide adduct barmed by adding 30 to 60 moles of ethylene oxide to 1 mole of castor oil.

3. A composition as set forth in claim 1 or 2, wherein the hydroxyl value of the foam stabilizer is smaller than 10 mg-KOH/g.

4. A foamable phenolic resin composition comprising, as indispensable components, (a) 100 parts by weight (as solids) of a resol liquid phenolic resin, (b) 3 to 100 parts by weight of an acidic curing agent, (c) 1 to 50 parts by weight of a blowing agent, (d) 0.1 to 50 parts by weight of a saccharide and (e) 0.1 to 10 parts by weight of a foam stabilizer, wherein the resol liquid phenolic resin is a resol liquid phenolic resin obtained by subjecting a phenol and an aldehyde to addition condensation reaction in the presence of a catalyst having a metal ion-forming capacity and the residual amount of the catalyst is smaller than 0.1 part by weight as the metal element per 100 parts by weight of solids of the resol liquid phenolic resin.

5. A composition as set forth in claim 4, wherein the residual amount of the catalyst in the resol liquid phenolic resin is smaller than 0.07 part by weight as the metal element per 100 parts by weight of solids of the resol liquid phenolic resin.

6. A composition as set forth in claim 4, wherein the foam stabilizer is a partial or complete acetylation product of a castor oil/ethylene oxide adduct having a hydroxyl value smaller than 15 mg-KOH/g, which is obtained by acetylating a castor oil/ethylene oxide adduct formed by adding 20 to 70 moles of ethylene oxide to 1 mole of castor oil.

7. A composition as set forth in claim 6, wherein the foam stabilizer is a partial or complete acetylation product of a castor oil/ethylene oxide adduct having a hydroxyl value smaller than 15 mg-KOH/g, which is obtained by acetylating a castor oil/ethylene oxide adduct formed by adding 30 to 60 moles of ethylene oxide to 1 mole of castor oil.

8. A composition as set forth in claim 7, wherein the hydroxyl value of the surfactant is smaller than 10 mg-KOH/g.

9. A composition as set forth in any of claims 6, 7 and 8, wherein the residual amount of the catalyst in the resol type liquid phenolic resin is smaller than 0.07 part by weight as the metal element per 100 parts of solids of the resol liquid phenolic resin.

10. A composition as set forth in claim 4 or 5, wherein the resol liquid phenolic resin is subjected to a catalyst-removing treatment with a weakly acidic cation exchange resin after the addition condensation reaction.

11. A composition as set forth in any of claims 6, 7 and 8, wherein the resol liquid phenolic resin is subjected to a catalyst-removing treatment with a weakly acidic cation exchange resin after the addition condensation reaction.

12. A composition as set forth in claim 4, wherein the saccharide is a member selected from the group consisting of ribose, xylose, arabinose, glucose, mannose, galactose, sucrose, molasses, fructose, lactose, maltose, raffinose, gentianose, stachyose, carboxymethyl cellulose, hydroxyethyl cellulose, corn starch, potato starch, gum arabic, fructan and mixtures thereof.

* * * * *